(No Model.)
C. EISENBERG.
NAILLESS FASTENING FOR HORSESHOES.
No. 564,245. Patented July 21, 1896.
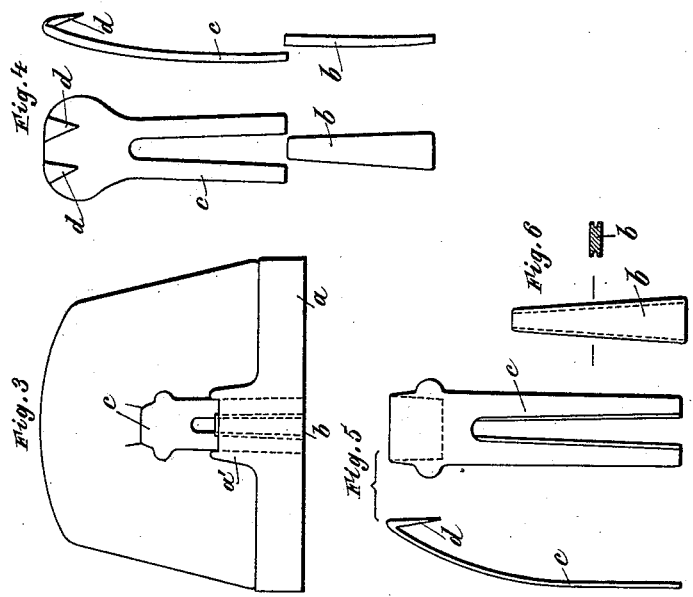
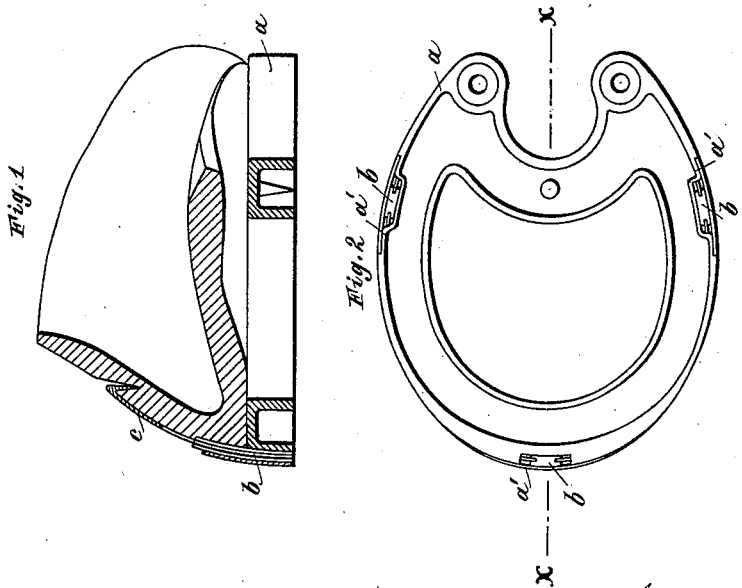

UNITED STATES PATENT OFFICE.

CHRISTIAN EISENBERG, OF BERLIN, GERMANY.

NAILLESS FASTENING FOR HORSESHOES.

SPECIFICATION forming part of Letters Patent No. 564,245, dated July 21, 1896.

Application filed September 28, 1895. Serial No. 564,033. (No model.)

*To all whom it may concern:*

Be it known that I, CHRISTIAN EISENBERG, a subject of the King of Prussia, Emperor of Germany, residing at Berlin, in the Kingdom of Prussia and German Empire, have invented a new and useful Improvement in Fastenings for Horseshoes, of which the following is a specification.

The present invention relates to the mode of fastening horseshoes to the hoof of the animal, differing from known constructions of this kind by the omission of connecting means, such as screws, nails, rivets, &c., admitting at the same time that the shoe can be quickly and securely connected to the hoof and can be easily removed at any time, so that the horses can be freed from the shoes in the evening.

The novel fastening device consists, essentially, in hooks to be placed in the shoe in corresponding dovetail grooves, wherein suitable keys are placed, which at the stepping of the horse tend to make the connection still more secure, while to remove the shoe it is sufficient to withdraw the keys and to take off the hooks.

In the accompanying drawings the present invention is shown, wherein—

Figure 1 is a vertical section through the hoof and the shoe on line $x\ x$ of Fig. 1. Fig. 2 is an under side view of same. Fig. 3 is a front view; and Figs. 4, 5, and 6 are detail views of the hooks and keys.

The shoe $a$ is provided with a number of projections $a'$, through which fork-shaped hooks $c$ can be placed. These hooks are provided at the top with one or more points $d$, as shown in Figs. 4 and 5, which can be driven into the horn of the hoof. Holes can, to this end, either be burned into the hoof, or may be drilled therein, or the hooks driven in, as stated. The lower fork-shaped ends of the hooks $c$ are so shaped as to leave a tapered slit between the prongs, into which a key or wedge $b$ can be introduced. In order to give to this key a sure seat, it is formed, as shown in Figs. 5 and 6, in cross-section, with grooves at the edges, wherein the prongs $c$ find a good hold.

When the shoe $a$ is to be secured to the hoof, the hooks $c$ (three in the present instance) are secured to the hoof so that the forked ends are downwardly suspended. The shoe is now placed from below so that the forked ends pass through the perforations of projections $a'$, suitably prepared for this purpose, and the keys or wedges $b$ are driven in between the prongs of the forked ends, whereby the connection between the shoe and the hoof is completely secured and becomes still faster while the horse is walking.

If it is desired to remove the shoe $a$, it is only necessary to loosen the keys, whereupon the shoe $a$ will drop readily and the hooks $c$ can be removed.

It will be understood that the prongs of the forked ends are spread apart by the keys and thereby firmly driven against the sides of the perforations through which the hooks are passing.

Having thus described my invention, what I claim, and desire to secure by Letters Patent, is—

A device for securing horseshoes, composed of a hook to be driven into the hoof or otherwise secured thereto, having forked ends adapted to pass into the shoe, and a key or wedge for insertion between said ends so as to spread the forked ends apart and thus to secure a solid connection which can be easily unfastened.

In witness whereof I have hereunto set my hand in presence of two witnesses.

CHRISTIAN EISENBERG.

Witnesses:
 WILHELM SCHWIETHAL,
 HEINRICH EHMICK.